June 3, 1947. C. R. BACON 2,421,675
COMBINATION FLUID DRIVE AND AUTOMATIC TORQUE MULTIPLIER
Filed May 24, 1944 2 Sheets-Sheet 2
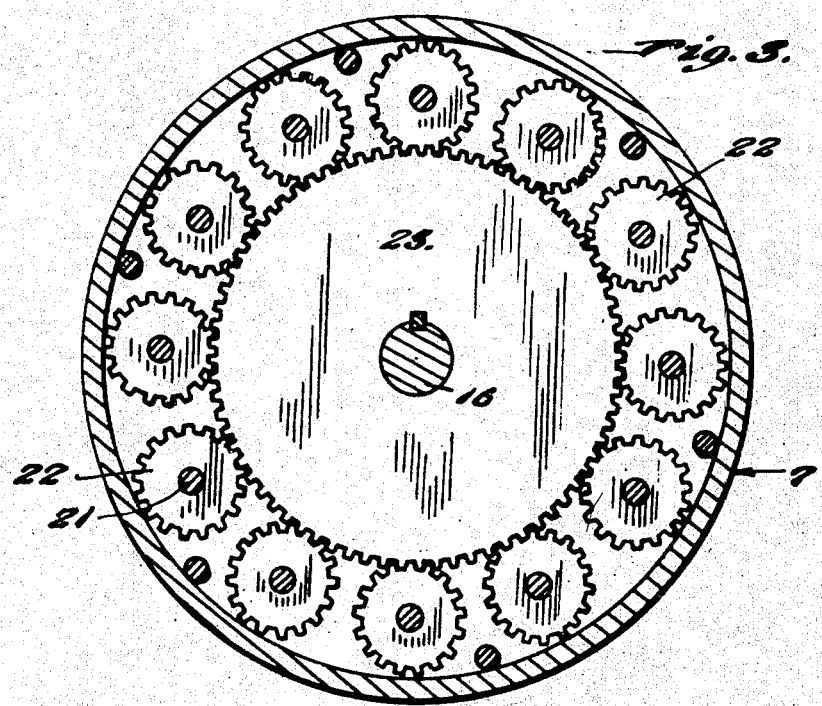
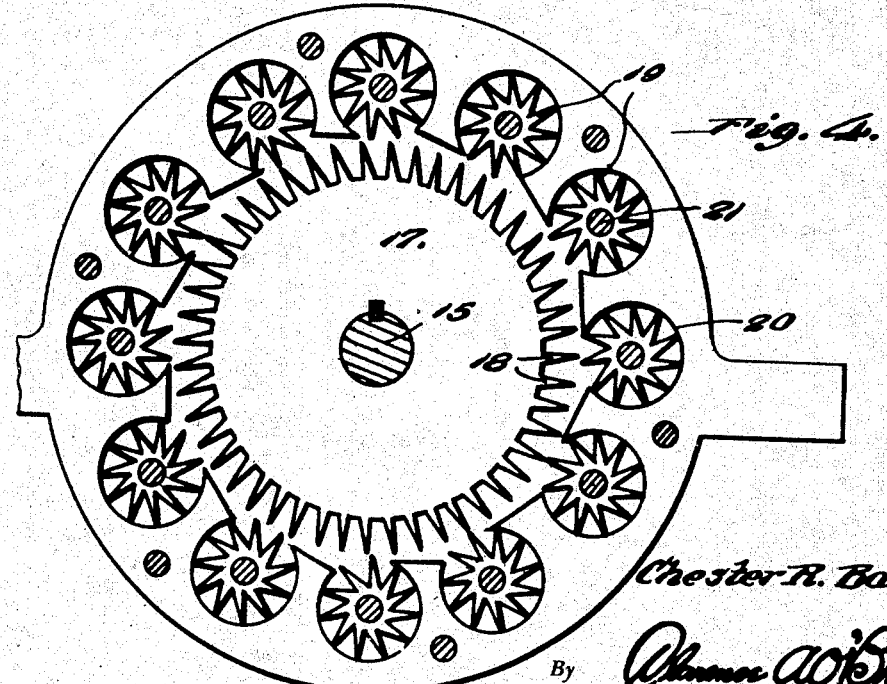
Inventor
Chester R. Bacon
By
Attorneys Patented June 3, 1947

2,421,675

UNITED STATES PATENT OFFICE 2,421,675

COMBINATION FLUID DRIVE AND AUTOMATIC TORQUE MULTIPLIER

Chester R. Bacon, Los Angeles, Calif.

Application May 24, 1944, Serial No. 537,177

3 Claims. (Cl. 74—189.5)

This invention relates to a novel and improved fluid type driving clutch or so-called fluid drive in which a fluid casing between coacting shaft-ends is provided with fluid actuator and impeller devices to provide a variable speed connection between said shaft-ends.

An object of this invention is to provide a shock absorbing fluid drive, an automatic fluid clutch which may slip without injury to itself, and at the same time provide automatic compensation for forced slippage or speed losses, with a corresponding increase of torque to the extent of a predetermined basic low gear reduction, after which slippage will occasion no further gear reduction, but will permit the fluid elements to slip entirely at very low or idling speed, to act automatically as a disengaged clutch, requiring merely increased speed to re-engage with easy starting, and rapid accelerating ability, without necessity of shifting of gears or manipulation of clutches, manually or otherwise.

In carrying out the principles of the invention I employ a double-chambered casing or housing construction, this having bearings for the adjoined and aligned drive and driven shafts, the driven shaft having gearing directly associated therewith, and the fluid clutch proper being associated in a separate chamber directly with the drive shaft, the clutch proper being characterized by a bladed central rotor and equidistant circumferentially spaced coordinated driven rotors, all of the parts coordinating their proportionate functions in producing an adaptable clutch aptly suited for the purposes intended.

Other phases of the principles of operation and attending features and advantages will become more readily apparent from the following description and the accompanying illustrative drawings.

In the drawings, wherein like numerals are employed to designate like parts throughout the same:

Figure 3 is a section on the plane of the line 3—3 of Figure 1.

Figure 4 is a similar section, this on the plane of the line 4—4 of Figure 1.

Figure 1:
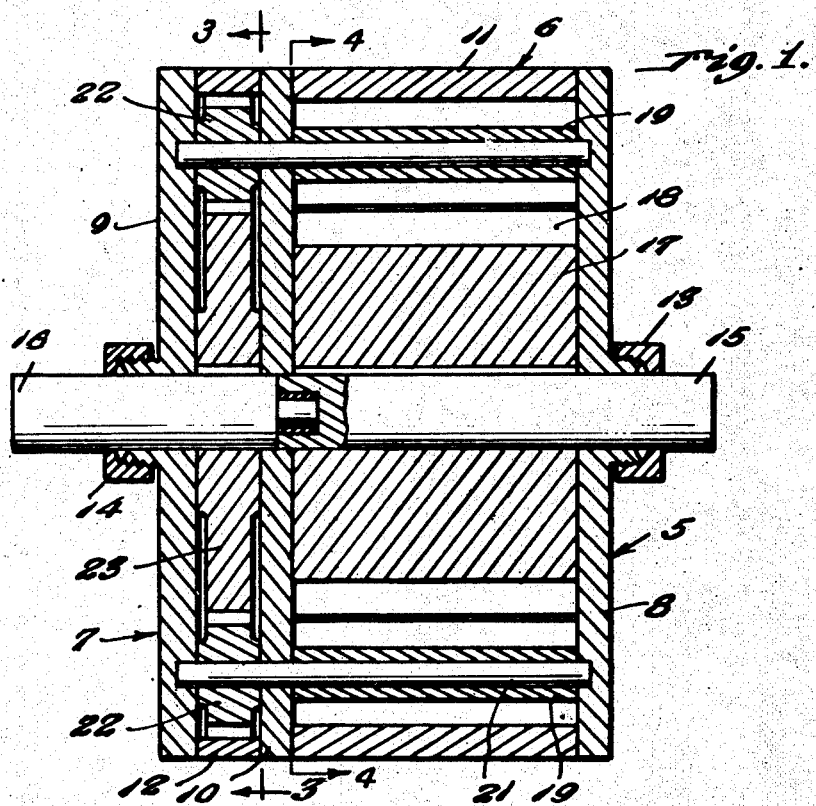
Figure 1 is a view partly in section and partly in elevation of a fluid drive or clutch constructed in accordance with the specific principles of the instant invention.
Figure 2:
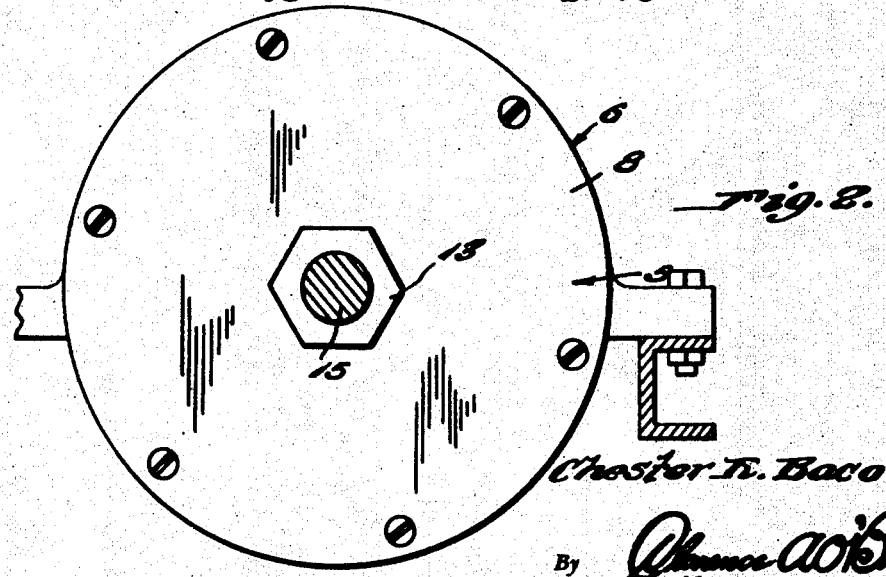
Figure 2 is a side elevational view thereof, observing either side.

The fixed casing or housing is denoted, generally, by the numeral 5. This casing, in actual practice, will be of appropriate dimension, shape and material and provided with suitable fixture means (not detailed) for attachment to relatively stationary supporting means. It preferably comprises two component portions, the main or essential part 6 and an associated ancillary part 7. Under the arrangement employed it is possible to use three division or assembling plates, that is, an outer plate 8 for the part 6 and an outer plate 9 for the part 7. By then interposing a partition plate 10 at the point indicated the chambered parts 6 and 7 are thus defined. The part 6 is the fluid clutch proper and the part 7 the gear housing. An annulus is arranged, as at 11, between the two plates 8 and 10 and secured in place in any appropriate manner. A smaller rim or annulus 12 is interposed between the plate 10 and the plate 9. The two outer plates 8 and 9 are provided with bearings 13 and 14, these to accommodate the drive shaft 15, on the one hand, and the driven or power take-off shaft 16 on the other. The adjacent or abutting shaft-ends are telescoped together and rotate in a central bearing provided in the partitioning plate 10. The main bladed rotor 17 in the chamber 6 is keyed on the drive shaft 15. As is brought out in Figure 4, this is provided with the marginal or peripheral radial circumferentially spaced blades 18. This is the main bladed rotor. The companion auxiliary rotors are denoted by the numerals 19 and these are arranged in individual pockets disposed at equi-distant circumferentially spaced points around the peripheral portion of the main rotor, said pockets or chambers being denoted at 20. These pockets open into the main oil chamber and the auxiliary rotors are provided with individual shafts 21 mounted for rotation in appropriate bearings in the parts 8, 10 and 9. The portions of the shafts 21 extending into the gear housing are provided with circumferentially spaced pinions 22 in mesh with the power take-off main gear 23, the latter being keyed on the power take-off shaft 16.

It is evident that the vanes or blades 18 on the main rotor are constructed and arranged to drive the fluid obliquely forward and outward by centrifugal force and the drive is thus partly pump action and partly tractor action.

The auxiliary or companion bladed rotors 19 have a predetermined ratio as to number of fluid vanes and as to circumference with respect to the driving rotor and these surround the driving rotor in close relation. These rotors revolve in closely fitted individual recesses formed in the housing or part 6. The energized fluid from the driving rotor 17 spends its energy driving the rotors 19 and is carried around the driven rotor recesses or chambers and discharged into the driving rotor vanes where it is immediately reenergized.

*Principle of operation.*—Should the output gear ratio be fixed at 4 to 1 reduction and the vane for vane relation as between the fluid rotors be fixed at 4 vanes on the driving rotor to 1 vane on the driven rotors, there would exist a 4 to 1 step-up in speed relation as between fluid elements, and an equal step down as between the gear elements. Therefore, there could be no mechanical advantage in the absence of all slippage as between fluid elements.

*Consider now the factor of slippage.*—Fluid pressure and its ability to exert torque upon a driven rotor is not diminished by mere slippage. In the event a very severe load resistance should force slippage to the extent of 4 vanes on the driving rotor passing a given point to 1 vane on the driven rotors, all fluid rotors would be turning at equal R. P. M. since there are 4 vanes on the driving rotor to 1 on the driven rotors. Therefore, the step-up relation as between driving and driven rotors has been neutralized without loss of fluid pressure or applied torque upon the driven rotors. Obviously the 4 to 1 gear reduction between the driven rotors and the output shaft remains operative as always. Therefore a 4 to 1 mechanical advantage is obtained because slippage has neutralized the fluid element step-up without loss of fluid pressure. Nevertheless, during such forced slippage between the driving and driven rotors the driven rotors are not revolving at the potential speed of the fluid impellation, since the driving rotor circumference is four times greater than that of the driven rotors. Therefore, the driven rotors may increase speed approximately four times upon sufficient lessening of the resistance forcing slippage, without necessity of increasing the driving rotor speed. This would again bring into effect the fluid element step-up. This would in the same measure as the step-up, neutralize the mechanical advantage gradually with a correspondent increase of output speed.

The fluid drive is designed to be capable of overdriving the reduction gear in the case of the lighter load or normal load. The fluid clutch is also designed to eliminate multiplication of fluid vane impellation as slippage occurs by reason of the passing sweep of the vanes on the usual confronting fluid rotors. In my design there are a fixed number of passing vane sweeps during both slipage or non-slippage. This number will be the same in both cases. This tends to maintain a nearly constant pressure on the driven rotors during slippage without passing the overload forcing the slippage onto the motor. Slippage in my design then cuts the overload off from the motor or powerplant and reduces the overdrive of the driven rotor until the drive shaft and the counter shaft are turning at the same speed. The same pressure that was driving the driven rotors at overdrive with a light load or normal load is driving the driven rotors at the same speed as the drive shaft and pulling the overload at gear reduced speed. Normal load attains speed by fluid rotor overdrive while abnormal load is handled by gear reduction at the sacrifice of speed. My design is for a very necessary principle to the successful obtaining of torque multiplication. It does not multiply vane impellation during slippage and maintains constant copulative capacity during same.

It is thought that persons skilled in the art to which the invention relates will be able to obtain a clear understanding of the invention after considering the description in connection with the drawings.

Minor changes in the shape, size and arrangement of details coming within the field of invention claimed may be resorted to in actual practice, if desired.

Having described the invention, what is claimed as new is:

1. In a fluid clutch of the class described, a housing comprising spaced end plates and a partition therebetween defining individual chambers, one constituting a gear housing and the other a fluid and multiple rotor compartment, a drive shaft mounted for rotation in the last-named compartment, a bladed rotor keyed on said drive shaft and located in said compartment, the marginal portion of said last-named compartment being provided with radial circumferentially spaced pockets, individual bladed rotors mounted for rotation in said pockets and operatively surrounding and mechanically coacting with the bladed peripheral portion of said main rotor, and gearing in the remaining gear housing together with a power take-off shaft in said housing and connected with said gearing, said gearing being driven by said second-named individual rotors.

2. In a fluid clutch of the class described, a stationary casing provided with bearings and oil seals, a plurality of marginal circumferentially spaced pockets in said casing, a drive shaft centrally mounted for rotation in said stationary casing, a bladed main rotor keyed on said drive shaft, individual bladed driven rotors mounted rigidly on individual counter shafts rotatably mounted bearings in said pockets and in said stationary casing, all of said driven rotors in said pockets being in coactive fluid relation with the main rotor, individual gears keyed upon said individual counter shafts extending from said individual pockets, a main driven take-off shaft centrally mounted for rotation in the stationary casing and in alignment with said drive shaft, a take-off gear keyed on said main driven shaft, and centrally in permanent mesh with all of the said individual gears upon the counter shafts.

3. In a fluid clutch of the class described, a double-chambered oil tight stationary casing provided with bearings and oil seals, a plurality of marginal circumferentially spaced pockets in the main chamber, a motion input drive shaft mounted centrally for rotation in said main chamber, a bladed fluid driving main rotor keyed on said drive shaft, a plurality of counter shafts mounted for rotation in said pockets and extending through the secondary chamber of the casing, a plurality of bladed fluid driven rotors rigidly mounted upon the said counter shafts in the circumferentially spaced pockets of the main chamber and in fluid relation with the main rotor, a plurality of gears keyed upon the counter shafts in the secondary compartment, a driven take-off shaft mounted for rotation centrally in the secondary chamber in axial alignment with the input drive shaft, a take-off gear keyed to said driven take-off shaft and in permanent mesh centrally with all the said counter shaft gears.

CHESTER R. BACON.

REFERENCES CITED

The following references are of record in the file of this patent:

UNITED STATES PATENTS

| Number | Name | Date |
| --- | --- | --- |
| 2,331,075 | Kumm | Oct. 5, 1943 |
| 2,350,416 | Perry | June 6, 1944 |
| 2,069,360 | Duffield | Feb. 2, 1937 |
| 2,131,619 | Duffield | Sept. 27, 1938 |

FOREIGN PATENTS

| Number | Country | Date |
| --- | --- | --- |
| 470,837 | Great Britain | Feb. 13, 1935 |
| 386,540 | Germany | Dec. 11, 1923 |